(12) United States Patent
Carter et al.

(10) Patent No.: US 7,415,253 B2
(45) Date of Patent: Aug. 19, 2008

(54) TEMPERATURE COMPENSATION OF TRANSMIT POWER OF A WIRELESS COMMUNICATION DEVICE

(75) Inventors: Keith A. Carter, Rancho Palos Verdes, CA (US); Brima B. Ibrahim, Aliso Viejo, CA (US); Siukai Mak, Poway, CA (US); Ken Gin, Diamond Bar, CA (US)

(73) Assignee: Broadcom Corporation, Irvine, CA (US)

( * ) Notice: Subject to any disclaimer, the term of this patent is extended or adjusted under 35 U.S.C. 154(b) by 674 days.

(21) Appl. No.: 10/910,426

(22) Filed: Aug. 3, 2004

(65) Prior Publication Data

US 2005/0288052 A1 Dec. 29, 2005

Related U.S. Application Data

(60) Provisional application No. 60/583,476, filed on Jun. 28, 2004.

(51) Int. Cl.
*H01Q 11/12* (2006.01)

(52) U.S. Cl. ............ 455/127.1; 455/522; 455/24; 455/67.11; 455/68; 455/69

(58) Field of Classification Search ......... 455/522, 455/24, 67.11, 68, 69, 115.3, 126, 127.1–127.3, 455/12, 6

See application file for complete search history.

(56) References Cited

U.S. PATENT DOCUMENTS

| | | | | |
|---|---|---|---|---|
| 6,115,587 | A * | 9/2000 | Kim ........................... | 455/126 |
| 6,661,999 | B1 * | 12/2003 | Johnson et al. .......... | 455/127.1 |
| 6,782,244 | B2 * | 8/2004 | Steel et al. ................ | 455/127.1 |
| 7,120,401 | B2 * | 10/2006 | Vaidyanathan et al. ... | 455/127.1 |
| 7,184,722 | B1 * | 2/2007 | Johnson et al. .......... | 455/127.1 |
| 7,236,745 | B2 * | 6/2007 | Wells et al. ............... | 455/67.11 |
| 2004/0235438 | A1 * | 11/2004 | Quilisch et al. .......... | 455/127.2 |

* cited by examiner

*Primary Examiner*—Edward Urban
*Assistant Examiner*—Fayyaz Alam
(74) *Attorney, Agent, or Firm*—Garlick, Harrison & Markison; Timothy W. Markison

(57) ABSTRACT

A method for temperature compensation of transmit power of a wireless communication device begins by measuring transmit power of the wireless communication device at a first temperature-based biasing condition to produce a first measured transmit power. The method continues by measuring transmit power of the wireless communication device at a second temperature-based biasing condition to produce a second measured transmit power. The method continues by determining ambient temperature of at least a portion of the wireless communication device based on the first and second measured transmit powers and a relationship between the first and second temperature-based biasing conditions. The method continues by compensating transmit power level of the wireless communication device based on the ambient temperature.

23 Claims, 7 Drawing Sheets transmit power v. temp w/2nd
bias being proportional to temp transmit power v. temp w/1st bias
being a constant over temperature power difference adjustable power amplifier 140

TEMPERATURE COMPENSATION OF TRANSMIT POWER OF A WIRELESS COMMUNICATION DEVICE

CROSS REFERENCE TO RELATED PATENTS

This invention is claiming priority under 35 USC § 119(e) to a provisionally filed patent application having the same title as the present patent application, a filing date of Jun. 28, 2004, and an application No. of 60/583,476.

BACKGROUND OF THE INVENTION

1. Technical Field of the Invention

This invention relates generally to wireless communication systems and more particularly to adjusting transmit power of a wireless communication device in such wireless communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

An important aspect of the transmitter is to provide a constant transmit power such that link budget (i.e., an understanding of the capabilities (e.g., bandwidth, data rates, error rates, etc.) of the transmit and receive wireless paths) is controlled. By controlling the link budget, the overall system performance can be managed in a more predictable manner. While it is desirable to provide a constant transmit power, it varies over temperature, supply voltage, and power requirements.

One solution to better maintain a constant output power is to measure the output power using a transducer or a computation of the output power based on current levels. From the measured output power, the gain and/or drive capabilities of the power amplifier are adjusted. While this improves constant output power, in more stringent wireless communication standard requirements, it does not provide a sufficiently constant output power and its rate of adjustment is too slow.

Therefore, a need exists for a fast responding technique for maintaining constant transmit power of a wireless communication device.

BRIEF SUMMARY OF THE INVENTION

The temperature compensation of transmit power of a wireless communication device of the present invention substantially meets these needs and others. In one embodiment, a method for temperature compensation of transmit power of a wireless communication device begins by measuring transmit power of the wireless communication device at a first temperature-based biasing condition to produce a first measured transmit power. The method continues by measuring transmit power of the wireless communication device at a second temperature-based biasing condition to produce a second measured transmit power. The method continues by determining ambient temperature of at least a portion of the wireless communication device based on the first and second measured transmit powers and a relationship between the first and second temperature-based biasing conditions. The method continues by compensating transmit power level of the wireless communication device based on the ambient temperature.

In another embodiment, an adjustable power amplifier includes an input amplifier section, an output amplifier section, a first biasing circuit, as second biasing circuit, and a gain adjust module. The input amplifier section is operably coupled to intermediately amplify output radio frequency (RF) signals to produce intermediately amplified RF signals. The output amplifier section is operably coupled to amplify the intermediate amplified RF signals to produce power amplified outbound RF signals. The first biasing circuit, when enabled, biases the output amplifier section in accordance with a first temperature to biasing relationship. The second biasing circuit, when enabled, biases the output amplifier section in accordance with a second temperature to biasing relationship. The gain adjust module is operably coupled to adjust gain of at least one of the input amplifier section and the output amplifier section based on transmit power level differences of the power amplified outbound RF signals when the first biasing circuit is enabled and when the second biasing circuit is enabled.

DETAILED DESCRIPTION OF THE INVENTION

Figure 1:
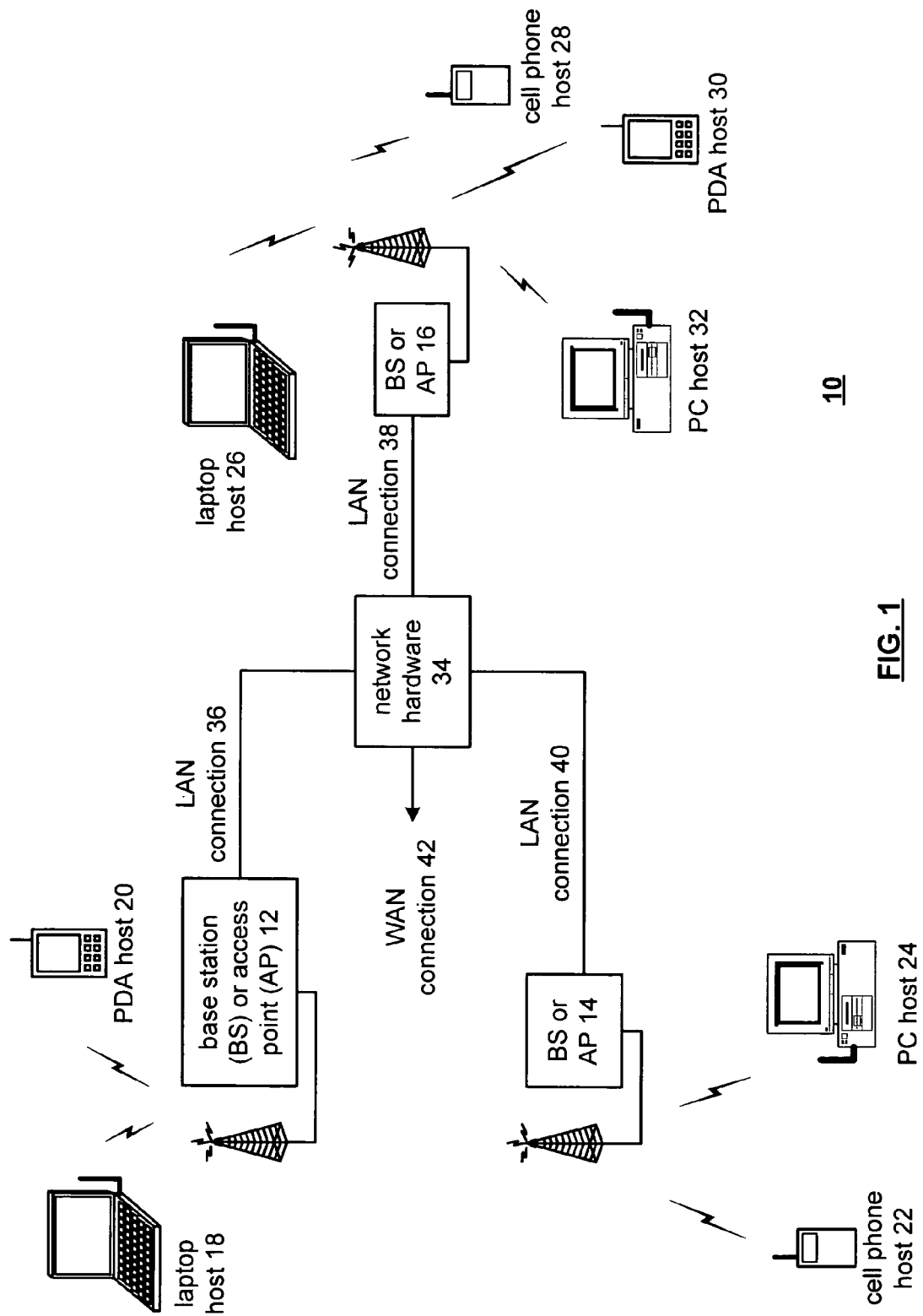
FIG. 1 is a schematic block diagram of a wireless communication system in accordance with the present invention.

FIG. 1 is a schematic block diagram illustrating a communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio.

Figure 2:
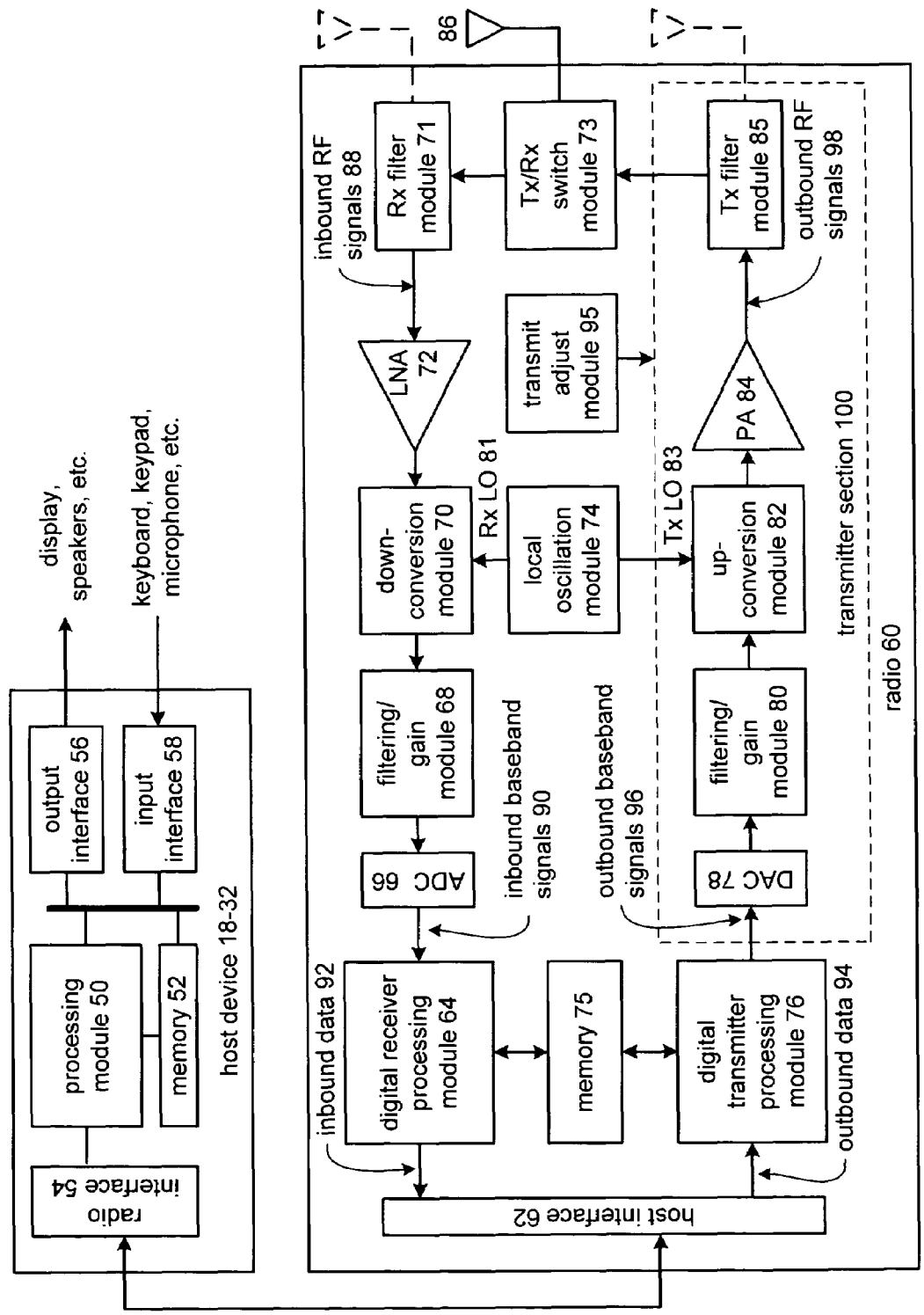
FIG. 2 is a schematic block diagram of a wireless communication device in accordance with the present invention.

FIG. 2 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, a radio interface 54, an input interface 58, and an output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, an analog-to-digital converter 66, a filtering/gain module 68, an IF mixing down conversion stage 70, a receiver filter 71, a low noise amplifier 72, a transmitter/receiver switch 73, a local oscillation module 74, memory 75, a digital transmitter processing module 76, a transmitter section 100, a transmit adjust module 95, and an antenna 86. The transmitter section 100 includes a digital-to-analog converter 78, a filtering/gain module 80, an IF mixing up conversion stage 82, a power amplifier 84, and a transmitter filter module 85. The antenna 86 may be a single antenna that is shared by the transmit and receive paths as regulated by the Tx/Rx switch 73, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11, Bluetooth, et cetera) to produce outbound baseband signals 96. The outbound baseband signals 96 will be digital base-band signals (e.g., have a zero IF) or a digital low IF signals, where the low IF typically will be in the frequency range of one hundred kilohertz to a few megahertz.

The digital-to-analog converter 78 converts the outbound baseband signals 96 from the digital domain to the analog domain. The filtering/gain module 80 filters and/or adjusts the gain of the analog signals prior to providing it to the IF mixing stage 82. The IF mixing stage 82 converts the analog baseband or low IF signals into RF signals based on a transmitter local oscillation 83 provided by local oscillation module 74. The power amplifier 84 amplifies the RF signals to produce outbound RF signals 98, which are filtered by the transmitter filter module 85. The antenna 86 transmits the outbound RF signals 98 to a targeted device such as a base station, an access point and/or another wireless communication device. The transmit adjust module 95, as will be described in greater detail with reference to FIGS. 3-9, functions to control the transmitter section 100 such that the transmit power of the transmitter section 100 is substantially constant over temperature, supply voltage variations, and/or power requirement variations.

The radio 60 also receives inbound RF signals 88 via the antenna 86, which were transmitted by a base station, an access point, or another wireless communication device. The antenna 86 provides the inbound RF signals 88 to the receiver filter module 71 via the Tx/Rx switch 73, where the Rx filter 71 bandpass filters the inbound RF signals 88. The Rx filter 71 provides the filtered RF signals to low noise amplifier 72, which amplifies the signals 88 to produce an amplified inbound RF signals. The low noise amplifier 72 provides the amplified inbound RF signals to the IF mixing module 70, which directly converts the amplified inbound RF signals into an inbound low IF signals or baseband signals based on a receiver local oscillation 81 provided by local oscillation module 74. The down conversion module 70 provides the inbound low IF signals or baseband signals to the filtering/gain module 68. The filtering/gain module 68 filters and/or gains the inbound low IF signals or the inbound baseband signals to produce filtered inbound signals.

The analog-to-digital converter 66 converts the filtered inbound signals from the analog domain to the digital domain to produce inbound baseband signals 90, where the inbound baseband signals 90 will be digital base-band signals or digital low IF signals, where the low IF typically will be in the frequency range of one hundred kilohertz to a few megahertz. The digital receiver processing module 64 decodes, descrambles, demaps, and/or demodulates the inbound baseband signals 90 to recapture inbound data 92 in accordance with the particular wireless communication standard being implemented by radio 60. The host interface 62 provides the recaptured inbound data 92 to the host device 18-32 via the radio interface 54.

As one of average skill in the art will appreciate, the wireless communication device of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 3:
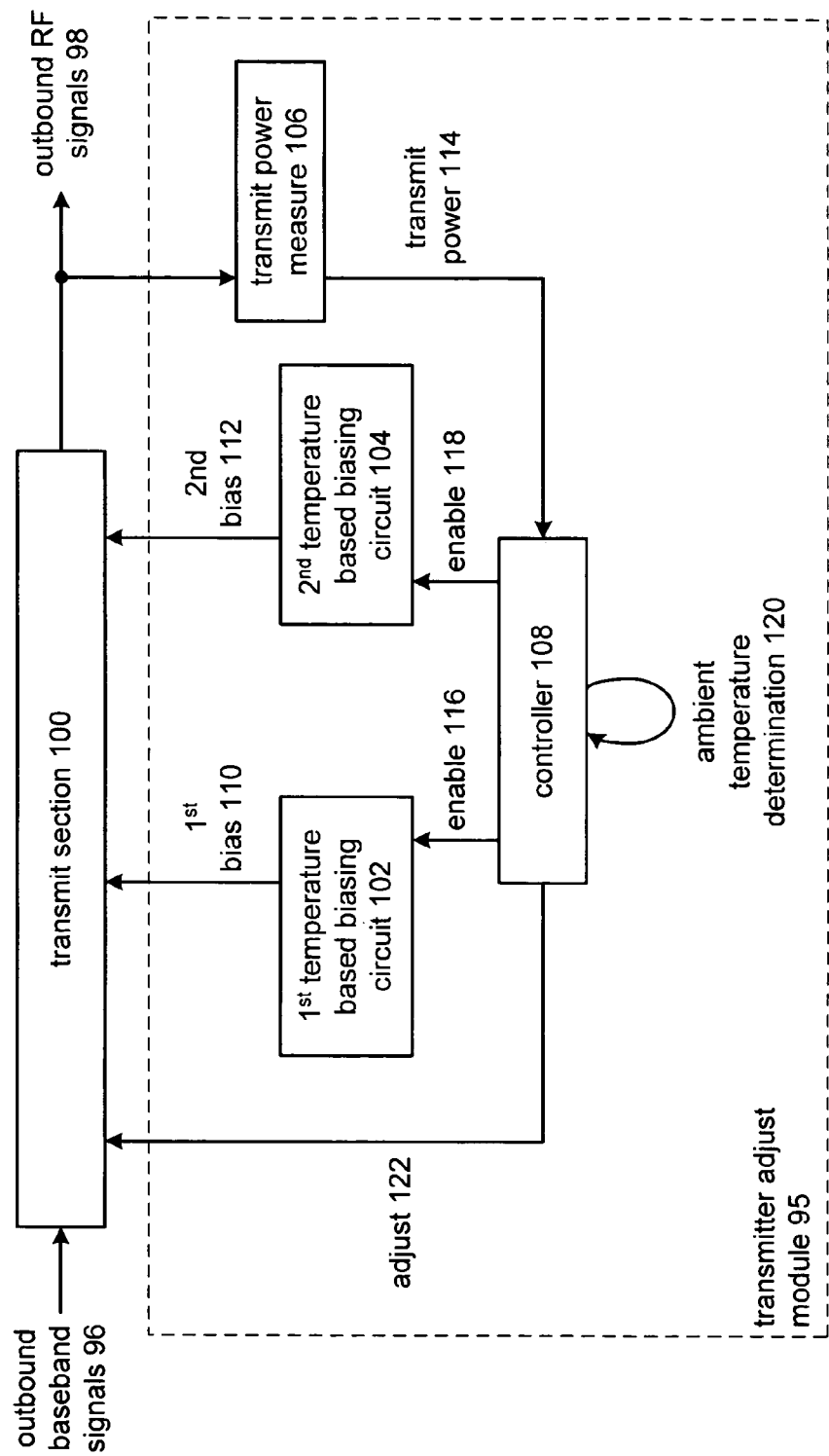
FIG. 3 is a schematic block diagram of a transmit adjust module in accordance with the present invention.

FIG. 3 is a schematic block diagram of a transmitter adjust module 95 operably coupled to the transmitter section 100. The transmitter adjust module 95 includes a $1^{st}$ temperature based biasing circuit 102, a $2^{nd}$ temperature based biasing circuit 104, a transmit power measurement module 106, and a controller 108. As shown, the transmitter section 100, based on signals provided by the transmit adjust module 95, converts outbound baseband signals 96 into outbound RF signals 98 having a constant transmit power over varying temperatures, power supply voltages, and/or power requirements.

In operation, the transmit power measurement module 106 measures the transmit power 114 of the outbound RF signals 98. The transmit power measurement module 106 may be a transmit signal strength indicator or a computational module that determines the transmit power 114 based on the currents of the in-phase and quadrature components of the outbound RF signals 98 or of the outbound baseband signals 96.

The measurement of the transmit power 114 is performed twice. The first measurement is taken when the $1^{st}$ temperature based biasing circuit 102 is enabled to provide a $1^{st}$ bias 110 to the transmit section 100. The $1^{st}$ bias 110 may be a constant to absolute temperature (CTAT) voltage or current. The second measurement is taken when the $2^{nd}$ temperature based biasing circuit 104 is enabled to provide a $2^{nd}$ bias 112 to the transmitter section 100. The $2^{nd}$ bias 112 may be a proportional to absolute temperature (PTAT) voltage or current.

The controller 108 provides enable signals 116 and 118 to the corresponding bias circuits 102 and 104. With the $1^{st}$ temperature based bias circuit 102 enabled, the controller 108 receives a first power measurement ($P_{CTAT}$) of the transmit power 114 with a constant to absolute temperature biasing. The controller 108 also receives a second power measurement ($P_{PTAT}$) of the transmit power 114 when the $2^{nd}$ temperature based bias circuit 104 is enabled. The controller 108 subtracts one of the power measurements from the other to obtain a power difference (e.g., $P_{CTAT}-P_{PTAT}$ or $P_{PTAT}-P_{CTAT}$). Based on the power difference, the controller 108 performs an ambient temperature determination algorithm 120 to determine an ambient temperature of the transmit section 100. The controller 108 determines a level of power adjustment based on the ambient temperature and generates an adjust signal 122, which is provided to the transmitter section 100. Based on the adjust signal 122, the transmitter section 100 adjusts internal biasing levels and/or gain settings such that the transmit power of the outbound RF signals 98 remains substantially constant over temperature, power supply voltage variations, and/or power requirement variations.

Figure 5:
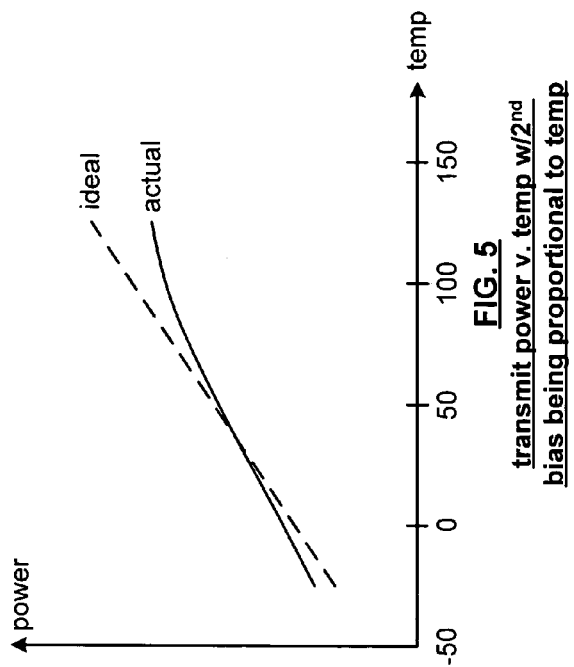
FIG. 5 is a graph of transmit power versus temperature with a second biasing of the transmitter section of the wireless communication device in accordance with the present invention.
Figure 4:
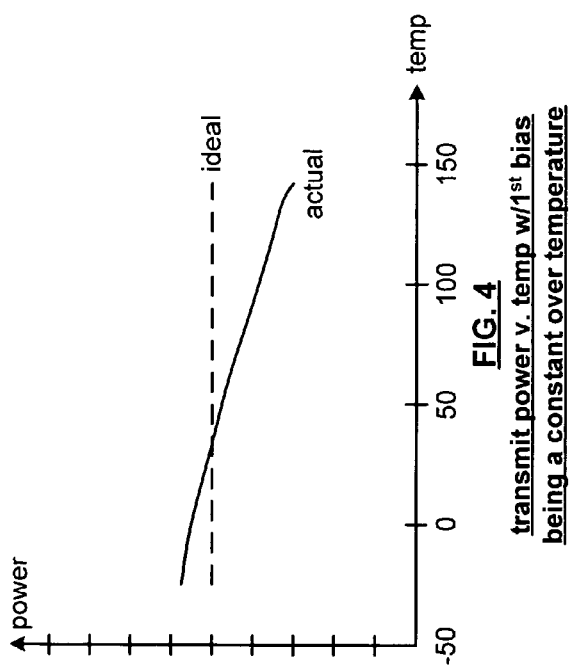
FIG. 4 is a graph of transmit power versus temperature with a first biasing of the transmitter section of the wireless communication device in accordance with the present invention.
Figure 6:
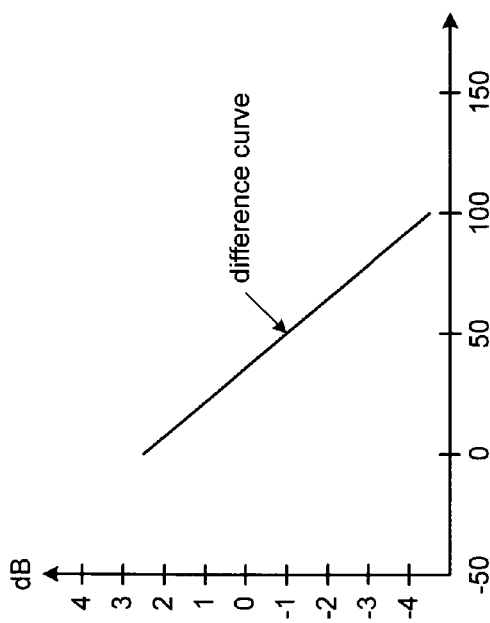
FIG. 6 is a graph of power difference versus temperature of the transmitter section of the wireless communication device in accordance with the present invention.

FIGS. 4-6 graphically illustrate the ambient temperature determination algorithm 120 and the determination of the adjust signal 122 performed by controller 108. FIG. 4 illustrates two curves with the $1^{st}$ bias 110 (i.e., a constant to absolute temperature bias) applied to the transmitter section 100. The first curve is an ideal curve, where, over temperature, the performance characteristics of the internal components (e.g., transistors, resistors, capacitors, inductors, etc.) of the transmitter section 100 do not varying with temperature such that the transmit power remains constant over temperature. The second curve represents an actual curve where the performance characteristics of the internal components of the transmitter section do varying with temperature such that the transmit power varies with temperature.

FIG. 5 illustrates two curves with the $2^{nd}$ bias 112 (i.e., a proportional to absolute temperature bias) applied to the transmitter section 100. The first curve is an ideal curve, where, over temperature, the performance characteristics of the internal components (e.g., transistors, resistors, capacitors, inductors, etc.) of the transmitter section 100 do not varying with temperature such that the transmit power increases correspondingly with the increasing bias 112. The second curve represents an actual curve where the performance characteristics of the internal components of the transmitter section do varying with temperature such that the transmit power varies from the ideal curve with temperature.

FIG. 6 illustrates a difference curve between the actual transmit powers of FIG. 4 and FIG. 5 over temperature. Since the variation of the performance characteristics of the internal components of the transmitter section 100 over temperature is substantially the same whether the first bias 110 (i.e., constant to absolute temperature) or the second bias 112 (i.e., proportional to absolute temperature) is applied to the transmitter section, the difference curve is substantially equal to the difference of the ideal curves. Based on the difference curve and the ideal curves, the ambient temperature of the transmitter section 100 can readily be determined.

For example, assume that the output power is proportional to the square of the bias currents in watts, or linear with respect to the log of the bias currents. Ideally, when the power amplifier of the transmitter section is biased with two types of currents, a constant-to-absolute temperature current ($I_{CTAT}$) and a proportional-to-absolute temperature current ($I_{PTAT}$), the power will be constant or increase with temperature as shown in FIGS. 4 and 5. In other words, $$(P_{PTAT})(T)=(DP_{PTAT}/dT) \times T + P_{PTAT}(0)$$

$$(P_{CTAT})(T)=K, \text{ where K is a constant.}$$

The crossover point (i.e., the temperature at which the power for the constant-to-absolute temperature biasing and the power for the proportional-to-absolute temperature biasing are equal) is defined since both power functions are created by design. For the ideal case, $$T\_cross=(K-P_{PTAT}(0))/DP_{PTAT}/dT.$$

Furthermore, the difference in power is also well defined as shown in FIG. 6 where $$\text{Delta } P(T)=P_{CTAT}-P_{PTAT}=K-((DP_{PTAT}/dT) \times T + P_{PTAT}(0)).$$

This allows a crossover point to be equivalently quantified by finding the point at which the difference in power is equal to zero. By transmitting a constant-to-absolute temperature bias and a proportional-to-absolute temperature bias power amplifier and simultaneously receiving the coupled power to determine the power difference (Delta P), the temperature (T) can be obtained in accordance with:

$$T=((K-P_{PTAT}(0))-\text{Delta } P)/DP_{PTAT}/dT.$$

Figure 7:
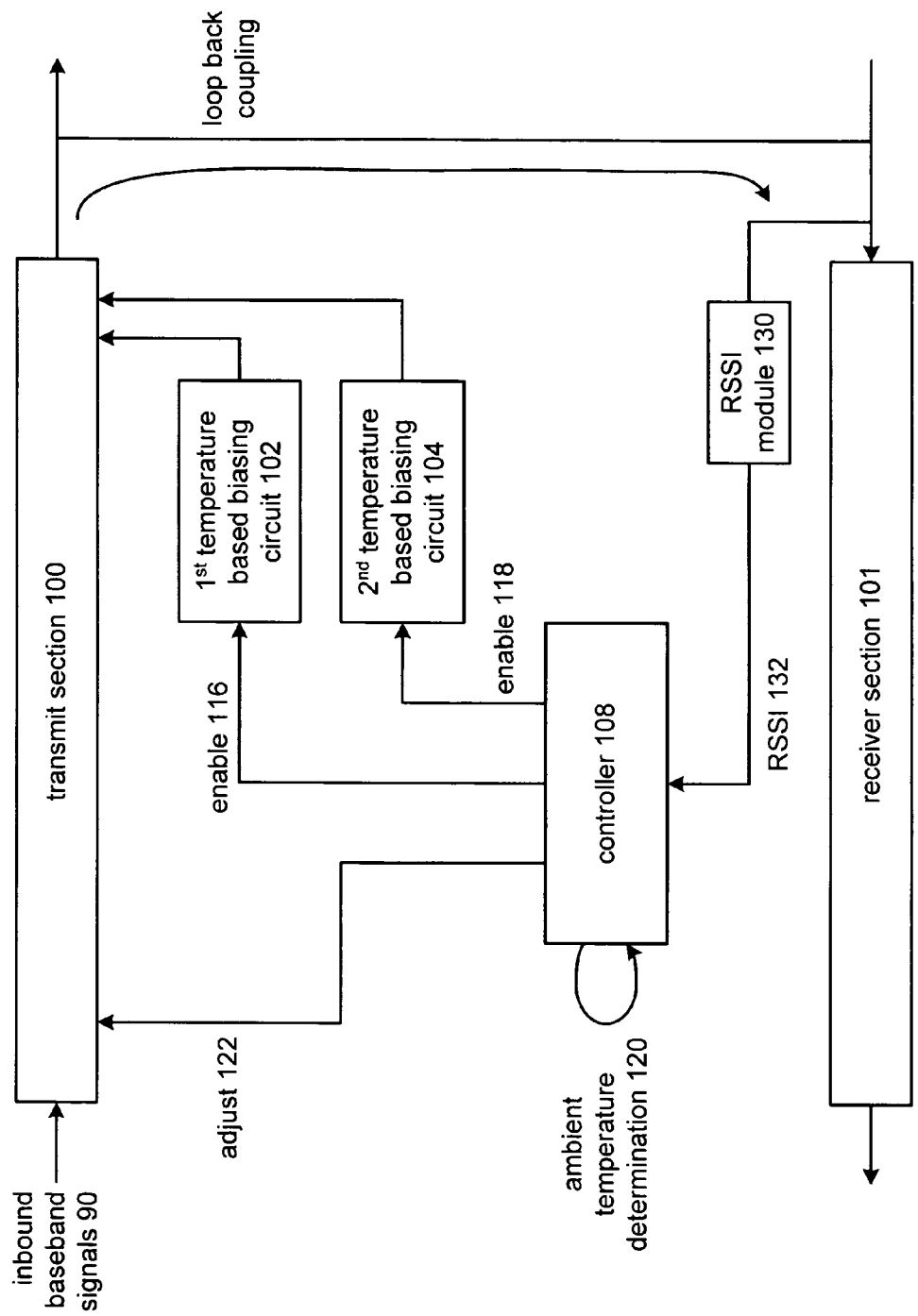
FIG. 7 is a schematic block diagram of another embodiment of the transmit adjust module in accordance with the present invention.

FIG. 7 illustrates an alternate embodiment of the transmit adjust module 95. In this embodiment, the transmit adjust module includes the controller 108, the $1^{st}$ and $2^{nd}$ temperature based biasing circuits 102 and 104 and a received signal strength indication (RSSI) module 130. In this embodiment, during a test and/or calibration of the radio, the output of the transmitter section 100 is coupled, in a loop back manner, to the RF input of the receiver section 101. The receiver section includes one or more of the received filter module 71, low noise amplifier 72, down conversion module 70, filter/gain module 68 and the analog-to-digital converter 66.

In this instance, the transmit power is measured from the receiver side 101 via the RSSI module 130, which produces an RSSI value 132. As such, by enabling the $1^{st}$ and $2^{nd}$ temperature based biasing circuits 104, the controller 108 measures the power via the RSSI value 132. From the differing RSSI values 132, the ambient temperature determination 120 may be determined as described above such that the adjust signal 122 may also be determined.

Note that in one embodiment the receive gain and transmit levels should be adjusted to provide enough RSSI range such that the effects of the temperature variation of the cascaded of the transmit signal/receive gain is detectable. Further, temperature effects may cause the transmitter to encounter power droop and the receiver to have gain variations. Since the effect is approximately equal for both the constant-to-absolute temperature biasing and the proportional-to-absolute temperature biasing, the differencing effects are substantially cancelled.

Figure 8:
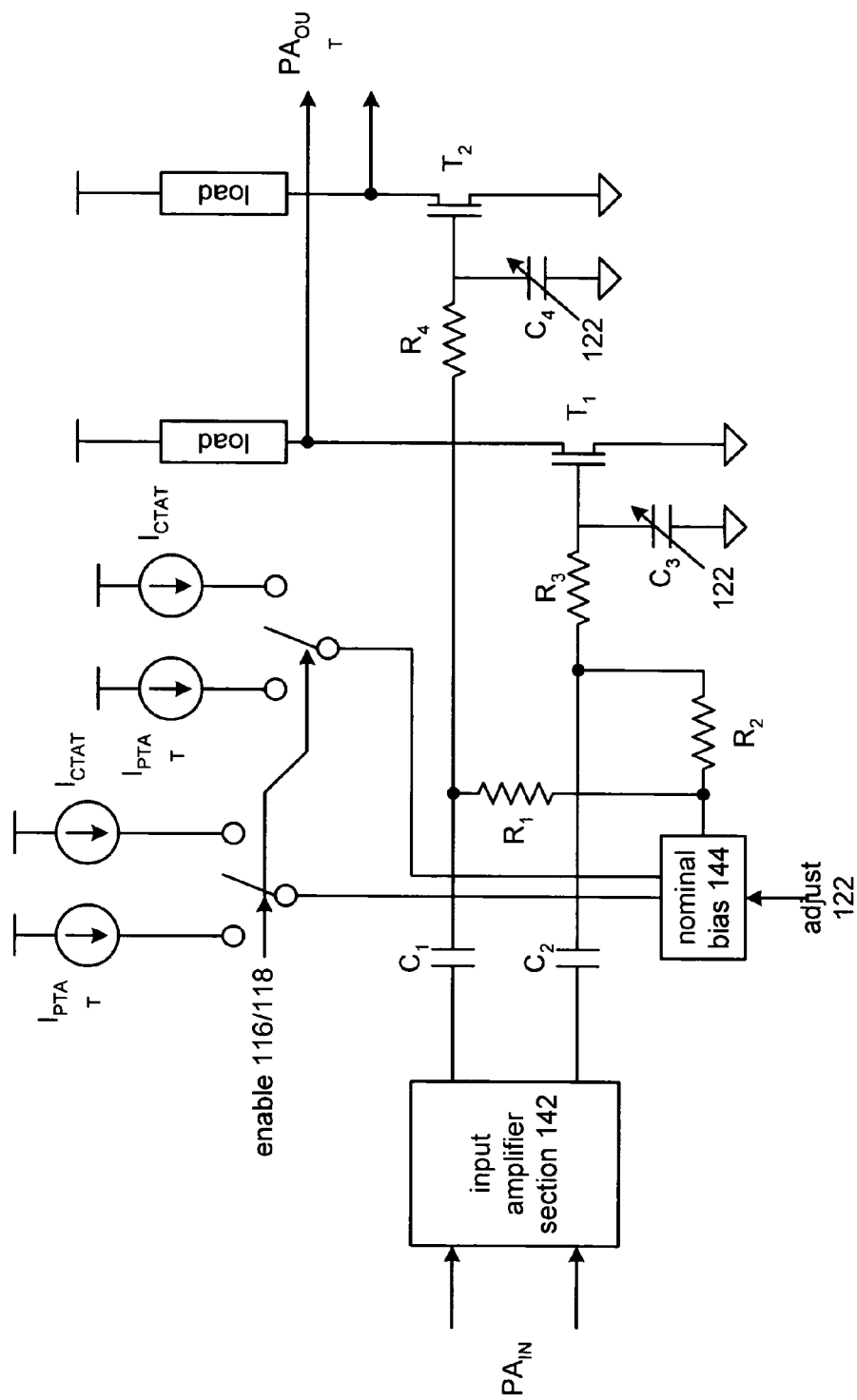
FIG. 8 is a schematic block diagram of an adjustable power amplifier in accordance with the present invention.

FIG. 8 is a schematic block diagram of an adjustable power amplifier 140 that may be used within the transmitter section 100. The adjustable power amplifier 140 includes an input amplifier section 142, a nominal biasing circuit 144, loads, a plurality of resisters R1-R4, a plurality of capacitors C1-C3, a plurality of transistors T1 and T2 and a plurality of current sources ($I_{PTAT}$ and $I_{CTAT}$). The enable signal 116/118 from the controller 108 determines whether a constant-to-absolute temperature biasing current will be provided to the bias of the power amplifier or the proportional-to-absolute temperature current will be provided. With the switch open, the nominal biasing circuit 144, which may be adjusted via adjust signal 122, provides the bias voltage to transistors T1 and T2.

In operation, with the enable signals 116 and 118 disabled, i.e., no current is provided by the corresponding current sources, the input amplifier section 142 receives the power amplifier input ($PA_{IN}$). The input is AC coupled via capacitor C1 and C2 to the corresponding inputs of transistors T1 and T2. The nominal biasing circuit 144 is set at a particular biasing level such that the power amplifier output is at a desired level.

In the calibration mode, enable signal 116 may be active such that the constant-to-absolute temperature current sources are coupled to the biasing circuit 144. This adjusts the biasing level of the power amplifier 140. With the power amplifier 140 adjusted, the transmit adjust module 95 measures the corresponding power level of the outbound RF signals. Next, the proportional-to-absolute temperature current sources are activated via enable signal 118 such that they provide an adjustment to biasing current of transistor T1 and T2 provided by the biasing circuit 144. In this mode, the output power is again measured and based on the determinations made by controller 108, as previously discussed, the nominal bias circuit 144 and/or the gain of the power amplifier is adjusted, via adjust signal 122, such that the output power of the power amplifier remains substantially constant. Note that the gain of the power amplifier may be adjusted by adjusting capacitor C3 and/or C4.

Figure 9:
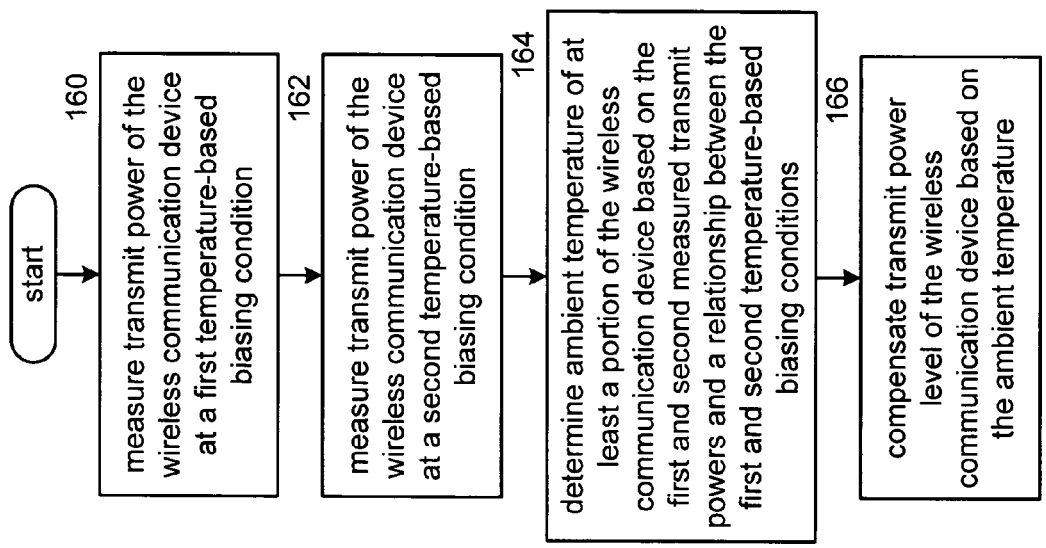
FIG. 9 is a logic diagram of a method for temperature compensation of transmit power of a wireless communication device in accordance with the present invention.

FIG. 9 is a logic diagram of a method for temperature compensation of transmit power of a wireless communication device. The process begins at Step 160 where the transmit power of a wireless communication device is measured at a $1^{st}$ temperature based biasing condition to produce a $1^{st}$ measured transmit power. The $1^{st}$ temperature based biasing condition may be a constant-to-absolute temperature biasing. The process then proceeds to Step 162 where the transmit power of the wireless communication device is measured at a $2^{nd}$ temperature based biasing condition to produce a $2^{nd}$ measured transmit power. The $2^{nd}$ temperature based biasing condition includes a proportional-to-absolute temperature biasing. Note that, in one embodiment, the transmit powers may be measured by providing a loop-back path from the transmitter section to the receiver section, where the receiver section measures the transmit signals via the loop-back path.

The process then proceeds to Step 164 where ambient temperature of at least a portion of the wireless communication device is determined based on the $1^{st}$ and $2^{nd}$ measured transmit powers and a relationship between the $1^{st}$ and $2^{nd}$ temperature based biasing conditions. In one embodiment, the determination of the ambient temperature may be done by subtracting one of the $1^{st}$ and $2^{nd}$ measured transmit powers from the other to produce a power difference. The ambient temperature may then be determined based on the power difference and the relationship between the proportional-to-absolute temperature biasing and the constant-to-absolute temperature biasing. This was illustrated with respect to FIGS. 4-6. Alternatively, the ambient temperature may be determined by accessing a look-up table utilizing the power difference as the index to the look-up table.

The process then proceeds to Step 166 where the transmit power level of the wireless communication device is compensated based on the ambient temperature. The compensation of the transmit power level may be done by adjusting the gain setting within the transmit path (i.e., adjusting the power amplifier, mixers and/or baseband circuitry) based on the ambient temperature and/or by adjusting a bias level of the transmitter section.

As one of average skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a method and apparatus for temperature compensation of transmit power of a wireless communication device to maintain substantially constant transmit power over varying temperatures, power supply conditions, and/or power requirements. As one of average skill in the art will appreciate, other embodiments may be derived from the teaching of the present invention without deviating from the scope of the claims.

What is claimed is:

1. A method for temperature compensation of transmit power of a wireless communication device, the method comprises:
   measuring transmit power of the wireless communication device at a first temperature-based biasing condition to produce a first measured transmit power;
   measuring transmit power of the wireless communication device at a second temperature-based biasing condition to produce a second measured transmit power;
   determining ambient temperature of at least a portion of the wireless communication device based on the first and second measured transmit powers and a relationship between the first and second temperature-based biasing conditions; and
   compensating transmit power level of the wireless communication device based on the ambient temperature.

2. The method of claim 1 comprises:
   the first temperature-based biasing condition includes a constant to absolute temperature biasing; and
   the second temperature-based biasing condition includes a proportional to absolute temperature biasing.

3. The method of claim 2, wherein the determining the ambient temperature comprises:
   subtracting one of the first and second measured transmit powers from another of the first and second measured transmit powers to produce a power difference; and
   determining the ambient temperature based on the power difference and the relationship between the proportional to absolute temperature biasing and the constant to absolute temperature biasing.

4. The method of claim 3, wherein the determining the ambient temperature comprises:
   accessing a look up table using the power difference as an index to determine the ambient temperature.

5. The method of claim 1, wherein the measuring the transmit power of the wireless communication device at the first temperature-based biasing condition comprises:
   providing a loop back path from a transmitter section of the wireless communication device to a receiver section of the wireless communication device;
   receiving, by the receiver section, a radio frequency signal via the loop back path from the transmitter section; and
   measuring, by the receiver section, the power level of the radio frequency signal to determine the first measured transmit power.

6. The method of claim 5, wherein the measuring the power level comprises:
   determining a received signal strength indication of the radio frequency signal.

7. The method of claim 1, wherein the measuring the transmit power of the wireless communication device at the second temperature-based biasing condition comprises:
providing a loop back path from a transmitter section of the wireless communication device to a receiver section of the wireless communication device;
receiving, by the receiver section, a radio frequency signal via the loop back path from the transmitter section; and
measuring, by the receiver section, the power level of the radio frequency signal to determine the second measured transmit power.

8. The method of claim 7, wherein the measuring the power level comprises:
determining a received signal strength indication of the radio frequency signal.

9. The method of claim 1, wherein the compensating the transmit power level comprises:
determining one of a plurality of gain settings of transmit path of the wireless communication device based on the ambient temperature.

10. A wireless communication device comprises:
a receiver section operably coupled to convert inbound radio frequency (RF) signals into inbound low intermediate frequency (IF) signals;
a transmitter section operably coupled to convert outbound low IF signals into outbound RF signals, wherein the transmitter section transmits the outbound RF signals at a substantially constant power level, wherein the substantially constant power level is maintained by:
measuring transmit power of the transmitter section at a first temperature-based biasing condition to produce a first measured transmit power;
measuring transmit power of the transmitter section at a second temperature-based biasing condition to produce a second measured transmit power;
determining ambient temperature of at least a portion of the transmitter section based on the first and second measured transmit powers and a relationship between the first and second temperature-based biasing conditions; and
compensating transmit power level of the transmit section based on the ambient temperature to produce the substantially constant power level.

11. The wireless communication device of claim 10 comprises:
the first temperature-based biasing condition includes a constant to absolute temperature biasing; and
the second temperature-based biasing condition includes a proportional to absolute temperature biasing.

12. The wireless communication device of claim 11, wherein the determining the ambient temperature comprises:
subtracting one of the first and second measured transmit powers from another of the first and second measured transmit powers to produce a power difference; and
determining the ambient temperature based on the power difference and the relationship between the proportional to absolute temperature biasing and the constant to absolute temperature biasing.

13. The wireless communication device of claim 12, wherein the determining the ambient temperature comprises:
accessing a look up table using the power difference as an index to determine the ambient temperature.

14. The wireless communication device of claim 10, wherein the measuring the transmit power of the transmitter section at the first temperature-based biasing condition comprises:
providing a loop back path from the transmitter section to the receiver section;
receiving, by the receiver section, the outbound RF signals via the loop back path from the transmitter section; and
measuring, by the receiver section, the power level of the outbound RF signals to determine the first measured transmit power.

15. The wireless communication device of claim 14, wherein the measuring the power level comprises:
determining a received signal strength indication of the radio frequency signal.

16. The wireless communication device of claim 10, wherein the measuring the transmit power of the transmitter section at the second temperature-based biasing condition comprises:
providing a loop back path from the transmitter section to the receiver section;
receiving, by the receiver section, the RF signals via the loop back path from the transmitter section; and
measuring, by the receiver section, the power level of the RF signals to determine the second measured transmit power.

17. The wireless communication device of claim 16, wherein the measuring the power level comprises:
determining a received signal strength indication of the radio frequency signal.

18. The wireless communication device of claim 10, wherein the compensating the transmit power level comprises:
determining one of a plurality of gain settings of the transmitter section based on the ambient temperature.

19. An adjustable power amplifier comprises:
an input amplifier section operably coupled to intermediately amplify output radio frequency (RF) signals to produce intermediately amplified RF signals;
an output amplifier section operably coupled to amplify the intermediate amplified RF signals to produce power amplified outbound RF signals;
a first biasing circuit, when enabled, biases the output amplifier section in accordance with a first temperature to biasing relationship;
a second biasing circuit, when enabled, biases the output amplifier section in accordance with a second temperature to biasing relationship; and
gain adjust module operably coupled to:
measure transmit power of the outbound RF signals when the first biasing circuit is enabled to produce a first measured transmit power;
measure transmit power of the outbound RF signals when the second biasing circuit is enabled to produce a second measured transmit power;
determine ambient temperature of the adjustable power amplifier based on the first and second measured transmit powers and the first and second temperature to biasing relationship; and
adjust the gain based on the ambient temperature.

20. The adjustable power amplifier of claim 19 comprises:
the first biasing circuit including a constant to absolute temperature biasing circuit; and
the second biasing circuit including a proportional to absolute temperature biasing circuit.

21. The adjustable power amplifier of claim 20, wherein the determining the ambient temperature comprises:
subtracting one of the first and second measured transmit powers from another of the first and second measured transmit powers to produce a power difference; and determining the ambient temperature based on the power difference and the relationship between the proportional to absolute temperature biasing and the constant to absolute temperature biasing.

22. The adjustable power amplifier of claim 21, wherein the determining the ambient temperature comprises:

accessing a look up table using the power difference as an index to determine the ambient temperature.

23. The adjustable power amplifier of claim 19, wherein the gain adjust module further functions to adjust gain of at least one of the input amplifier section and the output amplifier section by:

determining one of a plurality of gain settings of the at least one of the input amplifier section and the output amplifier section based on the ambient temperature.

* * * * *